United States Patent
Banks

(12) 
(10) Patent No.: US 6,202,079 B1
(45) Date of Patent: Mar. 13, 2001

(54) SYNCHRONIZATION PROCEDURE IN A ROUTING NODE

(75) Inventor: Timothy William Banks, Winchester (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 08/655,528

(22) Filed: May 30, 1996

(30) Foreign Application Priority Data

Jun. 3, 1995 (GB) .................................................. 9511247

(51) Int. Cl.[7] ........................................................ G06F 9/00
(52) U.S. Cl. ............................................ 709/101; 709/104
(58) Field of Search ........................... 395/671, 650, 395/575, 600, 182.13; 375/354; 340/506, 150.5; 370/110.1, 2.01, 469, 100 T, 503; 709/100, 101, 107, 103, 104, 226

(56) References Cited

U.S. PATENT DOCUMENTS

| | | | |
|---|---|---|---|
| 5,039,980 | * 8/1991 | Aggers et al. | 340/506 |
| 5,235,597 | * 8/1993 | Himwich et al. | 370/469 |
| 5,258,982 | * 11/1993 | Britton et al. | 370/110.1 |
| 5,261,089 | * 11/1993 | Coleman et al. | 395/600 |
| 5,276,876 | * 1/1994 | Coleman et al. | 395/650 |
| 5,319,773 | * 6/1994 | Britton et al. | 395/182.13 |
| 5,390,298 | * 2/1995 | Kuszmaul et al. | 709/200 |
| 5,410,684 | * 4/1995 | Ainsworth et al. | 395/575 |
| 5,465,251 | * 11/1995 | Judd et al. | 370/54 |
| 5,500,860 | * 3/1996 | Perlman et al. | 370/401 |
| 5,550,873 | * 8/1996 | Dolev et al. | 375/354 |
| 5,561,797 | * 10/1996 | Gilles et al. | 395/600 |
| 5,574,849 | * 11/1996 | Sonnier et al. | 395/182.1 |
| 5,630,047 | * 5/1997 | Wang | 395/182.13 |

OTHER PUBLICATIONS

Leff et al. "Adaptive Transaction Routing in a Heterogeneous Database Environment", IEE pp. 406–413, 1989.*

* cited by examiner

Primary Examiner—Majid Banankhah
(74) Attorney, Agent, or Firm—Jeanine S. Ray-Yarletts

(57) ABSTRACT

Disclosed is a method for providing synchronization of a transaction in a data processing system where the transaction involves an initiator node, which starts said synchronization, and a coordinator node, which decides the outcome of said transaction. The initiator node and the coordinator node communicate through a routing node. The routing node has no resources of its own which are modified in the transaction. The synchronization is provided by establishing a first conversation between the initiator node and the routing node and a second conversation between the routing node and the coordinator node. A first commit request message is then sent from said initiator node to the routing node. A second commit request message is sent from the routing node to the coordinator node. An additional step is performed of storing asynchronously, checkpoint information to non-volatile storage in the routing node after establishing the first and second conversations and before sending said second commit request message. The routing node acts as just a routing node and does not save checkpoint state as if it were a node with a real need to do so. In the event of failure the routing node only recovers the routing information, that is the end points of the conversation it was routing when failure occurred. The resynchronization protocols are carried between the end points with the routing node not aware of their contents, except to monitor when it can safely forget its routing information.

8 Claims, 6 Drawing Sheets

SYNCHRONIZATION PROCEDURE IN A ROUTING NODE

TECHNICAL FIELD

The present invention relates to synchornization in data processing systems and in particular to a method for providing synchronization of a transaction in a data processing system.

BACKGROUND

In transaction processing systems, accesses and updates to system resources are typically carried out by the execution of discrete transactions(or units of work). A transaction is a sequence of coordinated operations on system resources such that either all of the changes take effect or none of them does. These operations are typically changes made to data held in storage in the transaction processing system; system resources include databases data tables, files, data records and so on. This characteristic of a transation being accomplised as a whole or not at all in also known as atomicity.

In this way, resources are prevented from becoming inconsistent with each other. If one of the set of updata operations fails then the others must also not take effect. A transaction then transforms a consistent state of resources into another consistent state, without necessarily preserving consistency at all intermediate points.

The atomic nature of transactions is maintained by means of a transaction synchronization procedure commonly called a commit procedure. Logical points of consistency at which resource changes are synchronized within transaction execution are called commit points or syncpoint; an application ends a unit of work by declaring a syncpoint, or by the application terminating.

Atomicity of a transaction is achieved by resource updates made within the transaction being held in-doubt (uncommitted) until a syncpoint is declared at completion of the transaction. If the transaction succeeds, the results of the transaction are made permanent (committed); if the transaction fails, all effects of the unsuccessful transaction are removed (backed out), and the resources are restored to the consistent state which existed before the transaction began.

There are a number of different transaction processing systems commercially available; an example of an on-line transaction processing system is the CICS system developed by International Business Machines Corporation (IBM is a registered trademark and CICS is a trademark of International Business Machines Corporation).

In a transaction data processing system which includes either a single site or node where transaction operations are executed or which permits such operations to be executed at only one node during any transaction, atomicity is enforced by a single-phase synchronization operation. In this regard, when the transaction is completed, the node, in a single phase, either commits to make the changes permanent or backs out the changes.

In distributed systems encompassing a multiplicity of nodes, a transaction may cause changes to be made to more than one of such nodes. In such a system, atomicity can be guaranteed only if all of the nodes involved in the transaction agree on its outcome. A simple example is a financial application to carry out a funds transfer from one account to another account in a different bank, thus involving two basic operations to critical resources: the debit of one account and the credit of the other. It is important to ensure that either both or neither of these operations take effect.

Distributed systems typically use a transaction synchronization procedure called two-phase commit (2PC) protocol to guarantee atomicity. In this regard, assume that a transaction ends successfully at an execution node and that all site resource managers (or agents) are requested to commit operations involved in the transaction. In the first phase of the protocol (prepare phase), all involved agents are requested to prepare to commit. In response, the agents individually decide, based upon local conditions, whether to commit or back out their operations. The decisions are communicated to a synchronization location, called coordinator, where the votes are counted. In the second phase (commit phase), if all agents vote to commit, a request to commit is issued, in response to which all of the agents commit their operations. On the other hand, if any agent votes to back out its operation, all agents are instructed to back out their operations.

Distributed systems are organized in order to be largely recoverable from system failures, either communication failures or node failures. A communication failure and a failure in a remote node generally manifest themselves by the cessation of messages to one or more nodes. Each node affected by the failure can detect it by various mechanisms, including a timer in the node which detects when a unit of work has been active for longer than a preset maximum time. A node failure is typically due to a software failure requiring restarting of the node or a deadlock involving preemption of the transaction running on the node.

System failures are managed by a recovery procedure requiring resynchronization of the nodes involved in the unit of work. Since a node failure normally results in the loss of information in volatile storage, any node that becomes involved in a unit of work must write state changes (checkpoints) to non-volatile storage synchronously with the transmission of messages during the two-phase commit protocol; these checkpoint data, or log, written to a stable storage medium as the protocol proceeds allow the same protocol to be restarted in the case of a failure of the node. Such writing to the stable storage medium may be synchronous or asynchronous. A synchronous write occurs when state changes (checkpoints) are written to non-volatile storage synchronously with the transmission of messages during the two-phase commit protocol. An asynchronous write occurs when state changes (checkpoints) are written to non-volatile storage prior to the transmission of messages during the two-phase commit protocol, such that the protocol does not have to wait until the completion of such data being written.

The IBM System Network Architecture or IBM SNA LU 6.2 syncpoint architecture developed by International Business Machines Corporation is known to coordinate commits between two or more protected resources. The LU 6.2 architecture supports a syncpoint manager (SPM) which is responsible for resource coordination, syncpoint logging and recovery.

A problem with known protocols for two-phase commit across networks is that they do not cater adequately for the case where sites act as routing nodes which distribute work to other parts of the system, with no resources of their own that require the property of atomicity. In the protocols known in the art, any node (including routing nodes) writes log data synchronously with the message transmission. These checkpoints involve a substantial delay in message transmission, because of the time required to save data to non-volatile storage; the protocol can only proceed after the writing has been performed hence greatly extending the time taken by it. This is unnecessary if, as for a routing node, no updates are made to resources which are dependent on the atomic properties which the two-phase commit protocol provides. Instead, the protocol need only ensure that end nodes which communicate through the routing node can contact each other in the case of a system failure.

An optimization of the two-phase commit protocol is described in "Open Commit Protocols Tolerating Commission Failures", Kurt Rothermel and Stefan Pappe, ACM Transactions on Database Systems, Vol. 18 Number 2, June 1993; this document is mainly addressed to systems including a disparate collection of nodes, some of which may be informally supported and without rigorous operating procedures. A protocol is described which tolerates the complete loss of certain nodes in the system, without losing coordination of the remaining nodes. The protocol requires the addition of a method for determining which nodes are trusted, a method for transmitting to each node the identity of the coordinator and means for a node to make contact with the coordinator following a failure, even if it had not originally been in contact during the syncpoint conversation. It should be noted that this protocol requires the identity of the coordinator to be recorded on non-volatile storage if there is any prospect of a node needing to start resynchronization protocols. In addition, this protocol is not immediately practical in its requirements for changes to a well established implementation.

SUMMARY OF THE INVENTION

The above drawbacks of the prior art are overcome by the invention as claimed. Accordingly, the present invention provides a method for providing synchronization of a transaction in a data processing system including an initiator node, starting said synchronization, and a coordinator node, deciding the outcome of said transaction, said initiator node and said coordinator node communicating through a routing node, the routing node having no resources related thereto modified in said transaction, said method comprising the steps of: establishing a first conversation between said initiator node and said routing node and a second conversation between said routing node and said coordinator node, sending a first commit request message from said initiator node to said routing node, sending a second commit request message from said routing node to said coordinator node, characterized by the step of: storing asynchronously, checkpoint information to a non-volatile storage in said routing node after said step of establishing said first and second conversations and before said step of sending said second commit request message.

The early asynchronous logging of routing data avoids the delay caused by synchronous logging during the two-phase commit processing, thus improving the response time of the transaction. Using the method proposed it is impossible to completely avoid the need to write to non-volatile storage, but it is arranged that the output takes place in parallel with other processing and any delay in message transmission is avoided. In most cases the number of synchronous write requests is zero.

Since all requests pass through the routing node, any optimization of the processing is very beneficial; the system according to the present invention then reduces the overall response time to the complex by reducing the amount of processing in the routing node.

It should be noted that the proposed solution requires only small or no changes to generalized architectures and it can be then easily incorporated into existing systems, allowing a relatively simple implementation. A further advantage, assuming no changes to generalized architectures, is that the solution may be introduced node by node into the system.

BRIEF DESCRIPTION OF DRAWINGS

Embodiments of the invention will now be described in detail, by way of examples, with reference to accompanying figures, where.

PREFERRED EMBODIMENT

Figure 1:
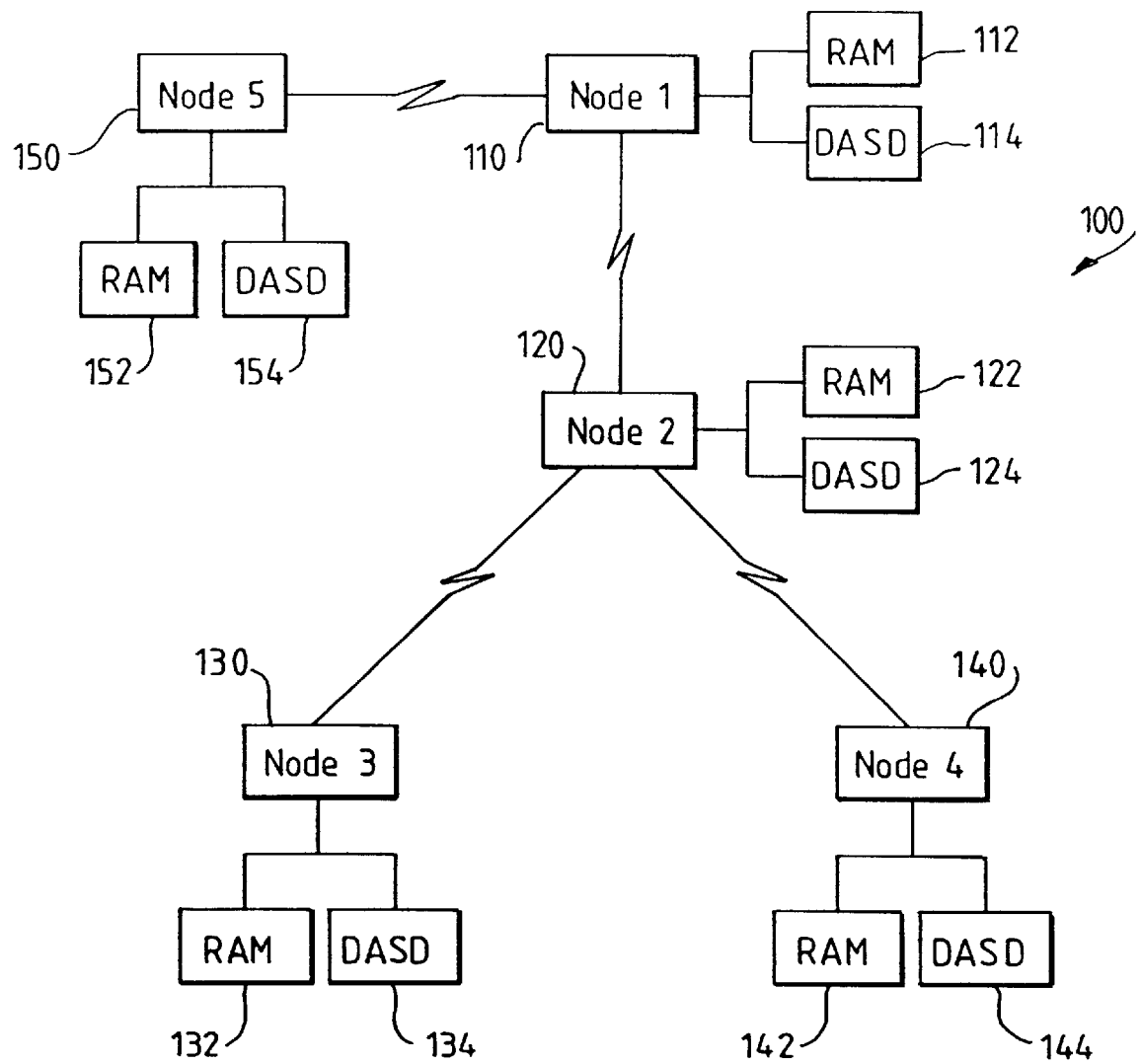
FIG. 1 is a schematic view of a data processing system which may be utilized to implement the present invention.

With reference now to the figures and in particular with reference to FIG. 1, a schematic view of a data processing system which may be utilised to implement the present invention is depicted. The general architecture 100 shows a distributed data processing system comprising five nodes. At an application node 110 there is, for example, a mainframe computer such as an IBM Enterprise System/9000 or ES/9000 (IBM is a registered trademark and Enterprise System/9000 and ES/9000 are trademarks of International Business Machines Corporation) executing a transaction-based application program, such as CICS from IBM Corp (CICS is a trademark of International Business Machines Corporation). Node 110 includes a volatile memory (or RAM) 112 and a non-volatile memory 114, typically a Direct Access Storage Device (or DASD), used for storing information about the 2PC protocol. Information stored in the non-volatile memory 114 is permanent, that is it is not lost if a node fails but can be accessed after the node has been restarted; information stored in volatile memory 112 is, on the contrary, lost if a node fails. Application node 110 accesses a plurality of local resources, for example a database by way of a database management system and a plurality of files on a direct access storage device. The application node 110 is enabled to communicate with similarly-constructed nodes 120, 130, 140 and 150 by way of a data communications facility. The transaction-based application program executing at the application node 110 is enabled to access resources at the other nodes, through a standard system interface such as the systems network architecture (SNA) by peer-to-peer protocols implemented in, for example, the LU 6.2 architecture extension. Node 120 acts as a routing node which distributes work to other nodes (130, 140) of the system, with no resources of its own involved in the transaction. Those skilled in the art will appreciate that nodes 120, 130 and 140 can be implemented by a single large centralised data server including a complex of coupled parallel processors. Externally the coupled complex of processing machines has one identity, that of the workload manager (or server front-end) 120 which initially accepts incoming request from an external node (or client) 110 and routes them to any one of a number of server processors 130 and 140 which execute the work.

Figure 2A:
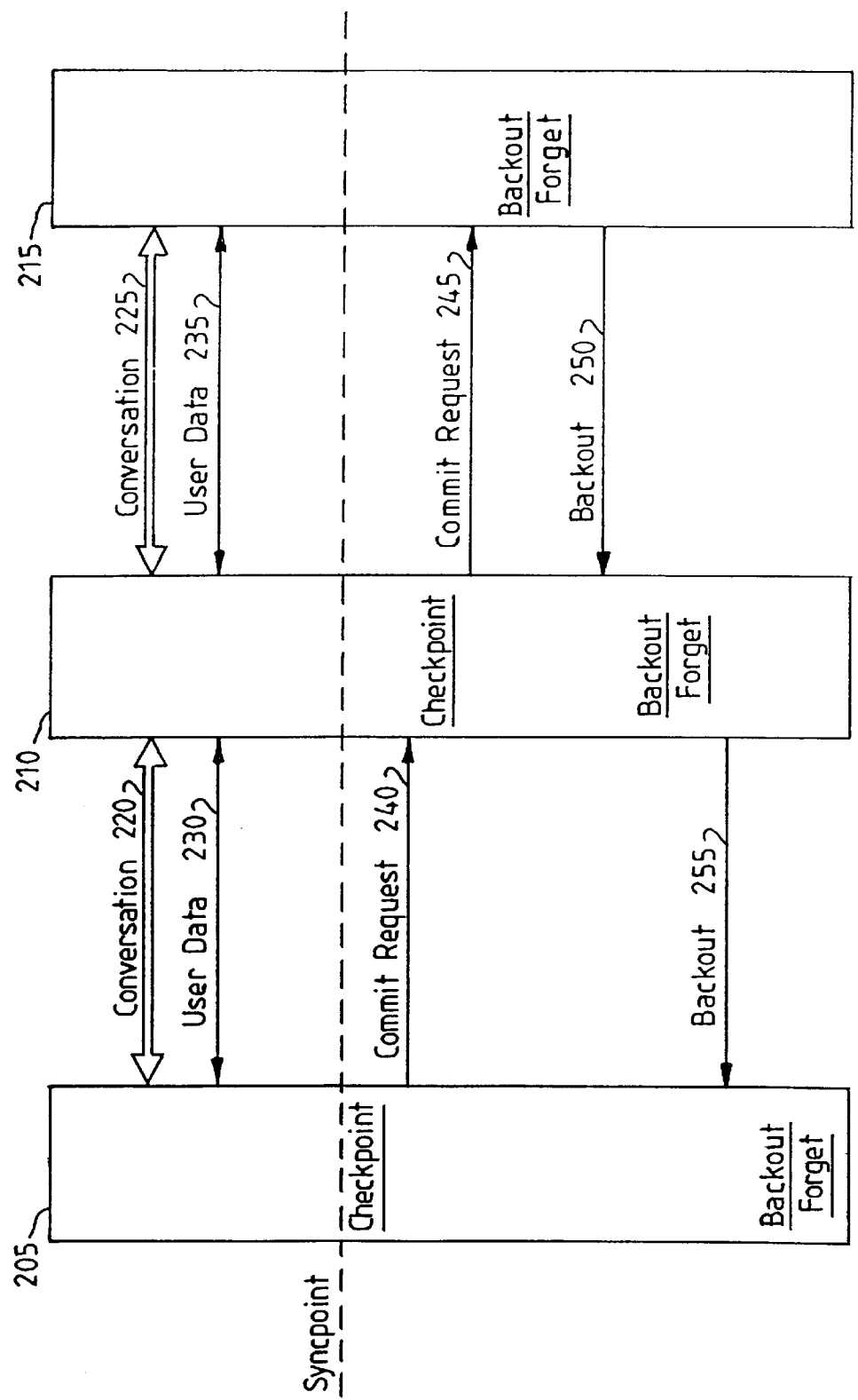
FIGS. 2a and 2b show two different examples of a two-phase commit protocol known in the art.
Figure 2B:
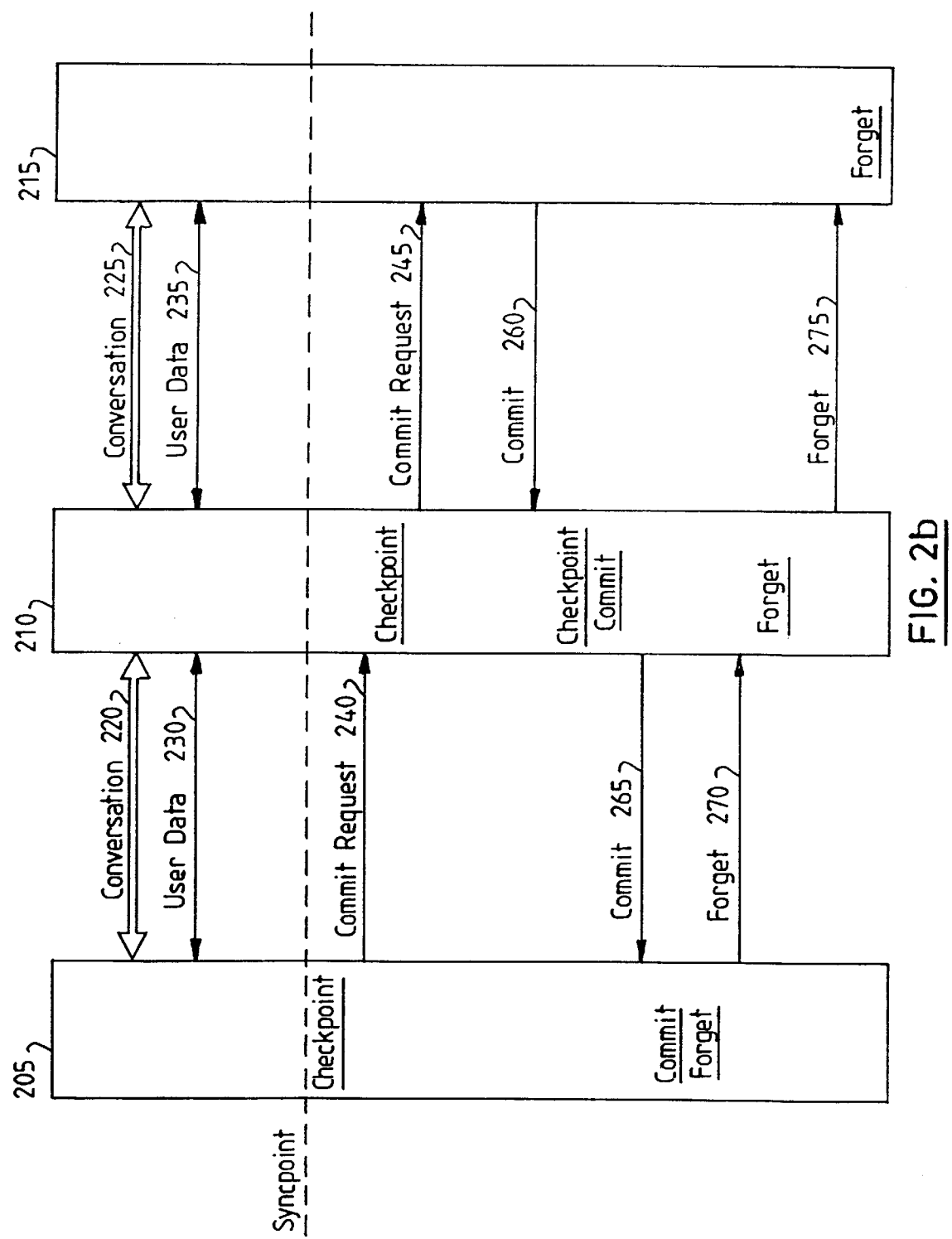

With reference to FIGS. 2a and 2b, two different examples of a two-phase commit protocol known in the art are depicted. FIG. 2a shows three nodes referred at 205, 210 and 215; nodes 205 and 215 are independent resource managers communicating through a routing node 210.

A transaction can be started by establishing a communication between nodes 205 and 215; a first conversation 220 between node 205 and routing node 210 and a second conversation 225 between routing node 210 and node 215 are allocated. Node 205 initiates the first conversation between itself and node 210 and so is termed the initiator of the conversation. Node 210, with which it converses is called the coordinator node. For the second conversation, node 210 is the initiator and node 215 is the coordinator.

Each conversation is provided by the use of a communication session between the two nodes. Since if a session fails during the syncpoint protocol, each node may try to contact the other to retransmit or ask for re-transmission of a message, two sessions are simultaneously available between each node.

When the transaction is started, each node 205, 210, 215 stores in its volatile memory information concerning the same transaction (e.g. the transaction unique identifier, the address of the other nodes involved). After these events, the user process may make changes as part of the unit of work; user data are exchanged between the nodes involved in the unit of work through user data messages 230 and 235.

The nodes exchange data messages until they decide, according to an agreed plan, that a syncpoint is due. A checkpoint, forcing unit of work information to non-volatile storage, takes place in the initiator node 205. This marks the beginning of the syncpoint. The initiator 205 then sends a commit request message 240 to node 210. The routing node 210 acts as a coordinator to the conversation with node 205 and as an initiator to the conversation with node 215. Routing node 210 thus saves checkpoint information to non-volatile storage and then sends a request commit message 245 to the coordinator node 215.

The coordinator node 215 makes the decision either to commit or backout the unit of work. If the decision is to backout, a backout message 250 is sent to node 210 and the unit of work is forgotten, that is, all transient states relevant to the processing of the unit of work's communication with the partner node are erased (or marked as erasable) to prevent accumulation of used storage at the node; no checkpoint information is saved to non-volatile storage. Node 210 in turn backs out the unit of work, deletes its transient state and sends a backout message 255 to node 205; node 205 can then backout the unit of work and delete its transient state, ending the protocol.

With reference now to FIG. 2b, a second example of a two-phase commit protocol between nodes 205, 210 and 215 is depicted. In the case shown in FIG. 2b, the decision taken at the coordinator node 215 is to commit. A checkpoint is taken at the commitment and unlocking of state changes for the unit of work; this event is forced onto non-volatile storage before a commit message 260 is sent to node 210. Routing node 210 in turn saves checkpoint information to non-volatile storage and then sends a commit message 265 to node 205. When the initiator node 205 receives the commit message 265, the unit of work is committed and then all transient states relevant to the processing of the unit of work's communication with the partner node are erased (or marked as erasable) to prevent accumulation of used storage at the node. A forget message 270 is then sent to node 210; node 210 in turn deletes its transient state information and sends a forget message 275 to node 215; node 215 can then delete its transient state and end the protocol.

It should be noted that in the protocol known in the art each node (including the routing node) saves checkpoint data to non-volatile storage. These checkpoints involve a substantial delay in message transmission, because of the time required to save data to a non-volatile storage; the protocol can only proceed after the writing has been performed hence greatly extending the time taken by it.

In the two-phase protocol described above, a resynchronization mechanism is used to recover the system after a failure, both in the event of a node failure and of a communication failure.

If a node fails while the transaction is being performed, no checkpoint has been taken, so that all information related to the transaction are lost. The partner node is then left with a pending unit of work and it must try resynchronization with the failed node sending a resynchronization message. Since the failed node has no information about the unit of work, it will reply with a not found message, causing the partner to backout the unit of work and forget it.

If a node fails after a checkpoint, the state of the node, including all locks on state which was modified during the unit of work, can then be reconstructed and the protocol restarted.

If a communication failure occurs, retransmission of a lost message is needed; after the communication failure both partners try to re-establish contact to find out what the other did or did not see and the protocol is restarted.

Particularly, if a communication failure occurs after the coordinator backed out the unit of work and forgot it, the coordinator merely responds to any inquiries about the unit of work as if it had never heard of it. Then, when the initiator sends a resynchronization message to the coordinator, it receives a not found message from it; a not found message is then interpreted by the initiator as meaning that either the unit of work has been backed out or committed and forgotten.

Considering now the case of a commit decision, once the commit message has been sent by the coordinator, it expects to receive a forget message. If a forget message is not received because of a communication failure, the coordinator actively attempts to contact the initiator; this is because the coordinator must be sure the partner has the commit decision before it forgets about the unit of work. Since the coordinator cannot be certain that the initiator will resynchronize, as the communication failure may have happened after the coordinator received the decision and itself forgot about the unit of work, a resynchronization message is then sent by the coordinator to its partner, asking if the unit of work can be forgotten. If the initiator is still in-doubt, the resynchronization from the coordinator is unnecessary, since the initiator will be attempting resynchronization of its own; both nodes can then ignore the resynchronization, anticipating that the resynchronization started by the initiator will resolve the state of the unit of work on both nodes. If the initiator has already committed the unit of work and forgotten it, the initiator answers with a not found message; the interpretation of a not found message by the coordinator becomes committed and forgotten.

Figure 3A:
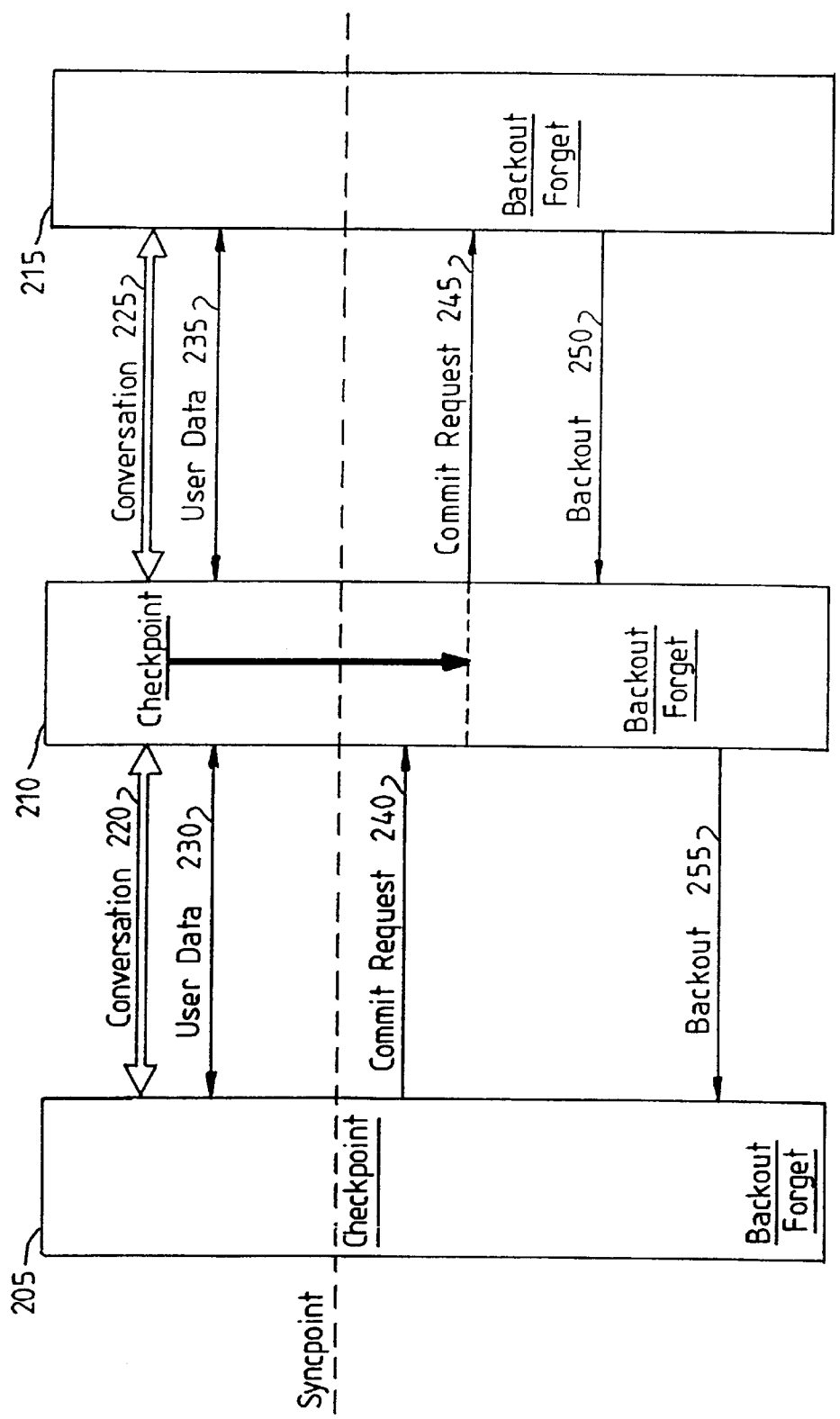
FIGS. 3a and 3b are schematic views of two aspects of an embodiment of the present invention.
Figure 3B:
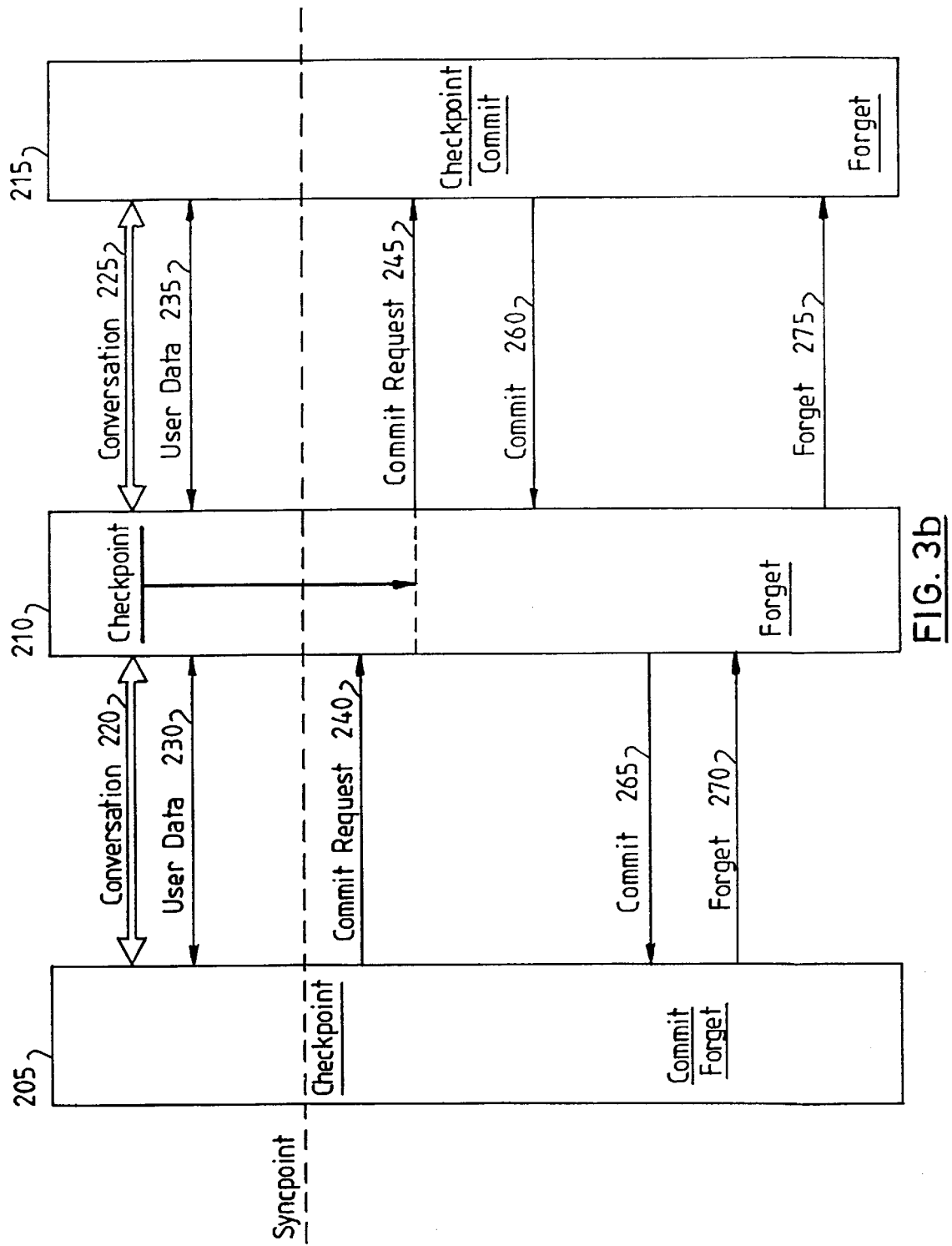

Referring now to FIGS. 3a and 3b, schematic views of two aspects of an embodiment of the present invention are shown.

FIG. 3a shows two end nodes, an initiator node 205 and a coordinator node 215, communicating through a routing node 210; routing node 210 has no resources of its own which are modified in the transaction nor resources which are to be synchronized. A unit of work starts allocating a first conversation 220 between node 205 and routing node 210 and a second conversation 230 between routing node 210 and node 215.

A checkpoint is taken asynchronously in the routing node 210 after the two conversations 220 and 225 have been started; writing information to non-volatile storage then begins at this point and completes in parallel with the real transaction activity, so that any delay in message transmission is avoided.

After the transaction has started, the node may make changes to the resources, involving user data messages 230 and 235 being exchanged between the end nodes 205 and 215 through routing node 210.

The start of the syncpoint begins when the initiator 205 forces a checkpoint to non-volatile storage and then sends a commit request message 240 to the routing node 210. No further checkpoint information is saved to non-volatile storage in the routing node 210. However, the asynchronous checkpoint started at routing node 210 must be complete before routing node 210 can ferry the commit request to the coordinator 215. It should be noted that in most cases no synchronous writing to non-volatile storage is required because the checkpoint data will likely have already been saved to non-volatile storage asynchronously. Then, a commit request message 245 is sent from the routing node 210 to the coordinator 215.

If the coordinator 215 decides to backout the unit of work, all transient states relevant to the processing of it are erased and a backout message 250 is sent to routing node 210. Routing node 210 in turn backs out the unit of work, deletes its transient state and sends a backout message 255 to node 205; node 205 can then backout the unit of work and delete its transient state, ending the protocol.

With reference now to FIG. 3b, a second example of a two-phase commit protocol according to the present invention is depicted. In the case shown in FIG. 3b, the decision taken at the coordinator 215 is to commit. A checkpoint is taken at the coordinator 215 and a commit message 260 is sent to routing node 210.

Routing node 210 then simply ferries the message between the two end nodes involved in the protocol by sending a commit message 265 to the initiator 205. No further checkpoint information is saved to non-volatile storage in routing node 210.

The initiator 205 commits the unit of work and deletes all transient states relevant to the processing of it. A forget message 270 is then sent to routing node 210; routing node 210 in turn deletes its transient state information and sends a forget message 275 to node 215; node 215 can then delete its transient state and end the protocol.

In the protocol according to the present invention the routing node then acts as only a routing node and does not save checkpoint states as if it were a node with a real need to do so; the start of the syncpoint and the possible commitment are not written to the non-volatile medium but they simply transform the state of the node in volatile memory. Using the method proposed it is impossible to completely avoid the need to write to non-volatile storage, but it is arranged that the output takes place in parallel with other processing and any delay in message transmission avoided. In most cases the number of synchronous write requests is zero. The asynchronous checkpoint involves substantially no time delay, as the protocol can proceed immediately. Since all requests pass through the routing node, any optimization of the processing is very beneficial; the system according to the present invention then reduces the overall response time to the complex by reducing the amount of processing in the routing node.

The dataflows between nodes in the case where there are no system failures is exactly the same as the dataflows in the two-phase protocol known in the art and described above.

The checkpoint synchronization and the resynchronization flows differ from that used in a conventional two phase commit protocol. In the case where a failure occurs, resynchronization at the initiator 205 and at the coordinator 215 takes place as normal. They may both try to finish the syncpoint protocol; the routing node must be prepared to ferry messages for two separate conversations. The protocol required to resynchronize the two end nodes can simply be ferried between them almost blindly; the routing node has only to check when it can safely forget its routing information. This happens when a forget or not found message is received as described in the foregoing.

If the routing node fails before its asynchronous checkpoint is completed, all information related to the transaction is lost. The routing node will reply to resynchronization messages from the end nodes with a not found message, causing the partner to backout the unit of work and forget it as described in the foregoing.

Figure 4:
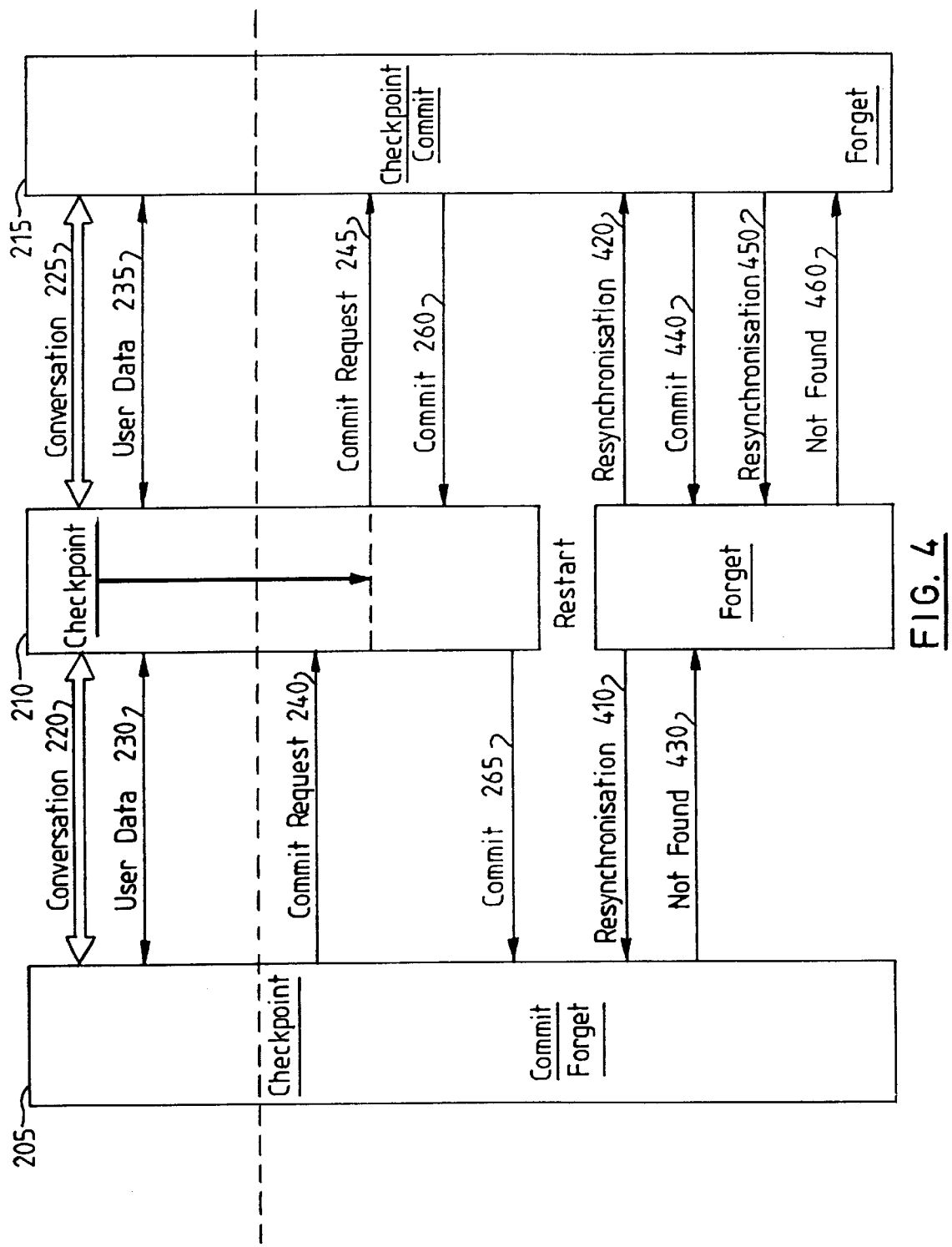
FIG. 4 shows an example of resynchronization in a particular embodiment of the present invention.

With reference now to FIG. 4, an example of resynchronization in the protocol of the present invention is shown. In the depicted example, the routing node 210 has failed after sending the commit message 265 to the initiator 205, which has then committed and forgotten the unit of work. A failure of the routing node 210 after the checkpoint results in the restoration of the state from it, which means that the node has no clue about the status of the syncpoint. The routing node 210 must then assume that the end nodes may never attempt resynchronization, because they may have backed out the unit of work and forgotten it; this means that the routing node must itself attempt resynchronization to discover whether its routing information can be erased.

Since the routing node 210 does not preserve sufficient checkpoint data to determine which end node was the initiator of the syncpoint, it must contact both of them, sending a resynchronising message 410 to node 205 and a resynchronising message 420 to node 215. The routing node 210 then examines the messages received by the two end nodes to see if any indicates that the sender has forgotten the unit of work, in which case the routing node 210 may also forget it.

In the depicted example, the initiator will send a not found message 430, while the coordinator will resend a commit message 440. Routing node 210 then forgets the unit of work and will reply to subsequent inquiries on its own behalf to say that the unit of work is not found. In the depicted example the coordinator 215 will send a resynchronization message 450 to the routing node 210 and the routing node will answer with a not found message 460; the interpretation of a not found message by the coordinator is then committed and forgotten.

The optimization can then be implemented without great upheavals in the existing protocol. In fact, the method described requires only that any node which wishes to engage in a syncpoint conversation traversing an optimized node should be prepared for a new occurrence of an existing message. The effort required to implement the change is then very small. A further advantage, assuming no changes to generalized architectures, is that the solution may be introduced node by node into the system.

The new resynchronization conversations described above interact with the normal ones, so that it is possible that the three nodes involved in the syncpoint conversation all attempt resynchronization at once, requiring three sessions between each node simultaneously. It should be noted that it is possible to reduce this requirement by modifying the protocol imposing synchronization only in the routing node.

Even though the description has been restricted for sake of simplicity to a tree with 3 nodes, those skilled in the art will appreciate that the described optimisation is independent of the number of nodes in the tree. The optimization described in the foregoing is implemented using the LU 6.2 last agent protocol of IBM SNA. However, the optimization can be used in different 2PC protocols for general trees, such as the presumed abort and presumed nothing versions of the 2PC protocol.

What is claimed is:

1. A method for providing synchronization of a transaction in a data processing system including an initiator node, which starts said synchronization, and a coordinator node, which decides the outcome of said transaction, said initiator node and said coordinator node communicating through a routing node, the routing node having no resources related thereto modified in said transaction, said method comprising the steps of:

establishing a first conversation between said initiator node and said routing node and a second conversation between said routing node and said coordinator node, sending a first commit request message from said initiator node to said routing node, sending a second commit request message from said routing node to said coordinator node, storing asynchronously, checkpoint information to a non-volatile storage in said routing node after said step of establishing said first and second conversations and before said step of sending said second commit request message.

2. The method according to claim 1, further including the step of sending from said routing node a first resynchronization message to said initiator node and a second resynchronization message to said coordinator node after a failure in said routing node.

3. The method according to claim 2, further including the step of forgetting said transaction in said routing node after receiving a message by said initiator node or said coordinator node indicating that said transaction has been forgotten.

4. The method according to claim 1, wherein further checkpoint information is stored only in a volatile memory in said routing node.

5. The method according to claim 4, further including the step of sending from said routing node a first resynchronization message to said initiator node and a second resynchronization message to said coordinator node after a failure in said routing node.

6. The method according to claim 5, further including the step of forgetting said transaction in said routing node after receiving a message by said initiator node or said coordinator node indicating that said transaction has been forgotten.

7. A distributed data processing system in which a transaction can be synchronized, the system comprising:

an initiator node for starting said synchronization;

a coordinator node for deciding the outcome of said transaction; and a routing node having no resources related thereto, modified in said transaction;

wherein said initiator node and said coordinator node are arranged to communicate by means of a first conversation between said initiator node and said routing node and a second conversation between said routing node and said coordinator node;

said initiator node comprises means for sending to said routing node a first commit request message; and said routing node comprises means for sending a second commit request message to said coordinator node;

characterized in that:

the routing node further comprises means for storing asynchronously, checkpoint information in non-volatile storage after said first and second conversations and before said second commit request message.

8. A routing node for use in a distributed data processing system in which a transaction can be synchronized, the system comprising an initiator node for starting said synchronization, a coordinator node for deciding the outcome of said transaction, wherein said initiator node and said coordinator node are arranged to communicate by means of a first conversation between said initiator node and said routing node and a second conversation between said routing node and said coordinator node, said initiator node comprises means for sending to said routing node a first commit request message;

the routing node, having no resources related thereto, modified in said transaction, comprising:

means for sending a second commit request message to said coordinator node;

characterized in that:

the routing node further comprises means for storing asynchronously, checkpoint information in non-volatile storage after said first and second conversations and before said second commit request message.

\* \* \* \* \*